United States Patent
Stump et al.

[15] 3,650,767
[45] Mar. 21, 1972

[54] PREPARATION OF SAUSAGE MEAT EMULSION

[72] Inventors: Harry C. Stump, Palatine; Paul L. Ford, Flossmoor, both of Ill.

[73] Assignee: Armour and Company, Chicago, Ill.

[22] Filed: July 30, 1969

[21] Appl. No.: 846,225

Related U.S. Application Data

[63] Continuation-in-part of Ser. No. 807,421, Mar. 14, 1969.

[52] U.S. Cl. ...............................................99/109
[51] Int. Cl. ...............................................A22c 11/00
[58] Field of Search ..................99/7, 18, 107, 109, 194; 260/412.6

[56] References Cited

UNITED STATES PATENTS

| | | | |
|---|---|---|---|
| 3,008,831 | 11/1961 | Christianson | 99/109 |
| 3,078,287 | 2/1963 | Downing | 99/109 X |
| 3,270,041 | 8/1966 | Artar et al. | 99/109 X |
| 3,295,982 | 1/1967 | Hickey et al. | 99/107 X |

*Primary Examiner*—Hyman Lord
*Attorney*—Carl C. Batz and Frank T. Barber

[57] ABSTRACT

A method for manufacturing sausage meat emulsions in which the broth produced in the high temperature wet rendering of pork fat is combined with frozen raw meat materials to form a sausage meat emulsion.

4 Claims, No Drawings

PREPARATION OF SAUSAGE MEAT EMULSION

This application is a continuation-in-part of copending application Ser. No. 807,421, filed Mar. 14, 1969, entitled "- Method for the Manufacture of Sausage."

BACKGROUND OF THE INVENTION

This invention relates to the manufacture of sausage meat emulsions and sausage products, and especially to those sausage products such as frankfurters, bologna and the like.

A meat emulsion for sausage generally consists of a protein and water phase (a continuous phase) and a fat phase (a discontinuous phase). It is believed that the protein and water of the meat form a matrix that encapsulates the fat protein. As is true with other emulsions, a meat emulsion may become unstable and break down. Temperature is significant in this regard and temperatures in excess of 70° F. while preparing the meat emulsion are generally not acceptable.

The moisture or water in a meat emulsion may be derived fully or in part from the meat ingredients themselves, however, many products would be dry and unpalatable if the moisture content were limited to the natural moisture of the meat. It is therefore common practice in the industry to add additional moisture to sausage emulsion products. The amount of moisture which can be added is limited by the stability characteristics of the emulsion itself, and is also limited by U.S. Government standards. For example, current regulations prescribe that the moisture content in final cooked frankfurters may not exceed four times the protein content plus 10 percent.

Thus it can be seen that the problem posed to a sausage industry involved the proper balance of the aforementioned requirements; that is, to provide for the addition for the correct amount of moisture while controlling the temperature of the emulsion, and at the same time maintaining the appropriate ratio of protein content to moisture content. A technique used very widely in the industry to satisfy these requirements is to select meat raw materials of sufficiently high protein levels and to add the moisture in the form of ice. Thus the ice performs the dual function of moisture addition and temperature control.

Although the foregoing procedure has been widely accepted, it has limitations which are alleviated or eliminated in the method of the present invention. Perhaps the most significant limitation of the aforementioned procedure is the difficulty of increasing moisture content while maintaining an acceptable moisture to protein ratio. As ice or water, which contains no protein, is added the moisture content increases but the moisture to protein ratio also increases. To reestablish the required moisture to protein ratio, protein must be added. However in a sausage emulsion the available protein source is the meat raw material which is a solid material. Therefore although the addition of solid meat material will decrease the moisture to protein ratio, it will also decrease the total moisture percentage. The present invention provides a unique solution to this problem.

Prepared meat products such as frankfurters, bologna and the like, have experienced an increased demand in recent years, largely due to their convenience. There are today many plants which specialize exclusively in prepared or processed meat items. These plants are generally not of sufficient size to support a full scale slaughtering operation, and so they must have an outside source of already butchered fresh meat. Because these processing plants may be geographically removed from the meat slaughtering point, the meat used is very often shipped and stored in a frozen condition. Portions of the frozen meat supply may be thawed from time to time and processed into the various meat items. The necessity to thaw the meat before it is processed of course requires additional time and space. The present invention provides an advantageous method of eliminating the thawing step.

SUMMARY OF THE INVENTION

We have discovered that the moisture content and the moisture to protein ratio of sausage meat emulsions can be more readily controlled in the present method, and it is an object of the present invention to facilitate the control of the aforementioned elements.

It is a further object of the present invention to provide a method of sausage preparation in which the protein content of the sausage can be increased without increasing the proportion of meat raw materials required.

It is still a further object of the present invention to provide a method for the preparation of sausage meat emulsions in which frozen raw meat materials can be advantageously employed directly in the preparation of the meat emulsion.

In the method of the present invention, the broth from high temperature wet rendering of pork fat is recovered, the broth generally being at a temperature of about 160° to 210° F. The hot broth is then added to frozen meat and fat raw materials, and the mixture is chopped to form a meat emulsion. Since the broth contains a substantial amount of useable protein, the resulting meat emulsion has a higher protein content than a meat emulsion made from similar meat and fat ingredients using water or ice for added moisture. The finished meat emulsion, may then be stuffed into sausage casings.

Thus, according to the present invention, a sausage meat emulsion is prepared by a process comprising providing a protein-containing broth obtained by the rendering of pork fat in the presence of moisture at a temperature in the range of about 185°–325° F. and a pressure in the range of about 15–60 p.s.i., then mixing from about 20 to 40 parts by weight of the broth while it is at a temperature in the range of from about 160°–210° F., with about 100 parts by weight of frozen uncooked meat and fat ingredients. Thereafter the mixture is chopped to form a stable meat emulsion having a temperature which is not in excess of 70° F.

DESCRIPTION OF PREFERRED EMBODIMENTS

In the preferred embodiments, broth is collected from a high temperature wet rendering of pork fat. In this type of rendering, the fat material is placed into tanks or kettles into which live steam is usually introduced. The heat from the steam causes the fat to be rendered or cooked out, the fat being separated for use as lard. As the heat is transferred from the steam, it condenses out to form a tank broth containing dissolved protein. In the case of the broth from pork fat rendering, the protein content of the broth was found to be about 10 to 14 percent.

The rendering process may be carried out in a wide range of temperatures and pressures which vary with the particular installation or technique. In general, high temperature wet rendering as used herein, includes temperatures of about 185° to 325° F. and corresponding pressures of 15 to 60 p.s.i. Rendering may be at a temperature of about 250°–325° F. and at pressures of about 40–60 p.s.i.

While the foregoing generally describes high temperature wet rendering techniques as they are presently practiced, it will be understood that the invention is not limited to a broth produced by that specific method. Rather the invention includes an equivalent broth which may be produced by the high temperature rendering of fat in the presence of moisture wherein the moisture does not function as the heat source as it does in the case of steam rendering. That is, the broth may be produced in a process wherein added moisture and fat are heated together by an external source of meat.

When the broth is recovered from the wet rendering process, it is quite hot, generally in the range of about 190° to 220° F. We prefer to use the broth very soon after it is recovered from the rendering kettles and before it has had an opportunity to cool significantly. In general, we prefer to incorporate broth in the meat emulsion while the broth is at a temperature of about 160° to 210° F. We have discovered that if the broth is allowed to stand at room temperature or under normal refrigeration temperatures for sufficient periods of time to allow it to cool, the broth will very quickly become sour and rancid and be rendered unusable in the present process. Accordingly, we prefer to use the broth while it is still hot after recovery from the rendering kettles.

However, if it is not feasible to use the broth directly after it has been recovered, it may be subjected to very rapid chilling, such as by a blast freezer and the like, in order to prevent the broth from becoming rancid. The broth can later be reheated to the preferred temperatures described herein for incorporating with the meat ingredients.

The raw materials used can be any meat or fat item commonly used in sausage meat emulsions including:
picnic trimmings
boneless beef plates
beef cheeks
skinless bellies
jowls
boneless chucks
boneless flanks
boneless butts
boneless hams
boneless loins It will be understood that the above-mentioned items are illustrative only and that other meat or fat items can be used, including poultry pieces.

In the practice of the preferred process, substantially all of the raw meat and fat ingredients must be frozen. The frozen meat ingredients are placed into a chopper and the hot pork broth is added. Any desired spices and cures may also be added at the time. The mixture may then be chopped, adding additional broth or additional frozen meat as may be necessary, and the chopping is continued until a stable meat emulsion is produced.

It is generally preferred to maintain an emulsion temperature during the process of about 40° to 70° F. We have found that temperatures within this range can easily be maintained by using the frozen meat ingredients and the hot pork broth. It is preferred to use the pork broth at a temperature of about 160° to 180° F., although broth at higher temperatures can also be used. We have found that a broth temperature of about 170° F. is particularly satisfactory.

Because of the temperature of the broth employed, it is not necessary to thaw the meat ingredients prior to their use in fabricating an emulsion. The heat absorbed by the frozen meat pieces from the broth brings the temperature of the overall mixture within the range desired for meat emulsions.

EXAMPLE I

A control sample was prepared, without the use of broth as called for in the present process, in order to establish a comparison of finished products. The control was prepared as follows: 100 pounds of frozen boneless picnic trimmings and 150 pounds of frozen boneless beef plates were placed in a chopper and 100 pounds of tap water at a temperature of 170° F. was added to the chopper, along with ordinary spices used for frankfurters. The mixture was chopped for 1½ minutes, after which 200 pounds of frozen boneless beef plates were added, along with 35 pounds of tap water at 170° F. The chopping was continued until a temperature of 53° F. was reached. The mixture was then run through a Comvac and Griffith Mince Master and the final emulsification was carried out, the final temperature of the emulsion being about 67° F. the emulsion was stuffed into casings and cooked in the usual manner. The resulting frankfurters were analyzed and found to have a 45.5 percent moisture content and a 9.9 percent protein content for a moisture to protein ratio of 4.6 to 1.

EXAMPLE II

Fresh pork fat was placed into lard rendering tanks and rendered with steam from 280° to 300° F. at 50 to 60 p.s.i. for about 2½ hours. The resulting condensate pork broth was drawn off and was found to contain about 12 percent protein. After the broth had cooled to about 170° F. it was placed in a chopper to which 100 pounds of frozen boneless picnic trimmings and 150 pounds of frozen boneless beef plates were added. The normal spices for frankfurters were also added as in Example I. The mixture was chopped for 1½ minutes, after which 200 pounds of frozen boneless beef plates were added and an additional 35 pounds of pork broth at 170° F. was added to the chopper. The mixture was chopped to a temperature of 53° F. The mixture was then transferred and processed through a Comvac and a Griffith Mince Master until an emulsion temperature of 67° F. was reached. The emulsion was then stuffed into casings and cooked in the conventional manner. The product was found to have good color, flavor, texture and peelability. The product was analyzed and found to have a 44.1 percent moisture content and an 11.6 percent protein content, for a moisture to protein ratio of 3.81 to 1.

As can be seen in the foregoing examples, the product prepared with the pork broth had a moisture content very nearly equal to that of the control sample, however the product made with the pork broth had a higher percentage of protein, and therefore a much lower moisture to protein ratio.

While in the foregoing specification and examples the method of the present invention has been set froth in considerable detail, it will be understood that the method can be varied widely by those skilled in the art without departing from the scope of the invention which is defined in the appended claims.

We claim:
1. A process for preparing a sausage meat emulsion comprising,
providing a protein-containing broth obtained by the rendering of pork fat in the presence of moisture at a temperature in the range of about 185°–325° F. and a pressure in the range of about 15–60 p.s.i.,
mixing from about 20 to 40 parts by weight of said broth while said broth is at a temperature in the range of from about 160°–210° F., with about 100 parts by weight of frozen uncooked meat and fat ingredients, and
chopping said mixture to form a stable meat emulsion having a temperature which is not over 70° F.

2. The process of claim 1 wherein said broth is obtained from a rendering process wherein said moisture is introduced as steam.

3. The process of claim 1 wherein said broth is obtained from a rendering process wherein said pork fat is rendered at a temperature in the range of about 250°–325° F. and a pressure in the range of about 40–60 p.s.i.

4. A process for preparing sausage products comprising
providing a protein containing broth obtained by the rendering of pork fat in the presence of moisture at a temperature in the range of about 185°–325° F. and a pressure in the range of about 15–60 p.s.i.,
mixing from about 20 to 40 parts by weight of said broth while said broth is at a temperature in the range of from about 160°–210° F., with about 100 parts by weight of frozen uncooked meat and fat ingredients,
chopping said mixture to form a stable meat emulsion having a temperature which is not over 70° F., and
stuffing said meat emulsion into a casing to form a sausage.

* * * * *